(12) United States Patent
Jacob

(10) Patent No.: US 8,470,922 B2
(45) Date of Patent: Jun. 25, 2013

(54) ETHYLENE-VINYL ALCOHOL BASED THERMOPLASTIC ELASTOMERS AND VULCANIZATES

(75) Inventor: Sunny Jacob, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 180 days.

(21) Appl. No.: 13/039,476

(22) Filed: Mar. 3, 2011

(65) Prior Publication Data

US 2012/0225990 A1  Sep. 6, 2012

(51) Int. Cl.
    C08L 29/04  (2006.01)
(52) U.S. Cl.
    USPC .......................................... 524/503; 525/57
(58) Field of Classification Search
    USPC .......................................... 524/503
    See application file for complete search history.

(56) References Cited

U.S. PATENT DOCUMENTS

| | | |
|---|---|---|
| 6,376,598 B1 | 4/2002 | Wang |
| 6,907,911 B2 | 6/2005 | Wang |
| 6,946,522 B2 | 9/2005 | Jacob et al. |
| 7,060,753 B2 | 6/2006 | Jacob et al. |
| 7,608,340 B2 * | 10/2009 | Tsuji et al. ............... 428/500 |
| 7,803,875 B2 | 9/2010 | Jacob et al. |
| 2006/0121227 A1 * | 6/2006 | Kim et al. ............... 428/36.9 |
| 2008/0151841 A1 | 6/2008 | Yi et al. |
| 2008/0255310 A1 | 10/2008 | Tsou et al. |
| 2008/0275187 A1 | 11/2008 | Tsou et al. |
| 2008/0314490 A1 * | 12/2008 | Morooka ............... 152/450 |
| 2008/0314491 A1 | 12/2008 | Soeda et al. |
| 2008/0314492 A1 | 12/2008 | Tsou et al. |
| 2009/0218024 A1 | 9/2009 | Tsou et al. |
| 2010/0331452 A1 | 12/2010 | Tsou et al. |

FOREIGN PATENT DOCUMENTS

| | | |
|---|---|---|
| EP | 0 703 279 | 3/1996 |
| EP | 722850 | 5/1999 |
| EP | 1 176 168 | 1/2002 |
| EP | 1 431 342 | 6/2004 |
| JP | 7-55929 | 9/1996 |
| JP | 2007/211059 | 8/2007 |

OTHER PUBLICATIONS

U.S. Appl. No. 12/838,076, filed Jul. 16, 2010; Inventors: Caraway Et al., "Adhesive Extrusion for Dynamically Vulcanized Thermoplastic Elastomer Laminates".

* cited by examiner

Primary Examiner — Hui Chin

(57) ABSTRACT

Ethylene-vinyl alcohol (EVOH) based thermoplastic elastomers (TPE) and thermoplastic vulcanizates (TPV) including a cured rubber dispersed therein and an EVOH-rubber compatibilizer.

12 Claims, No Drawings

ETHYLENE-VINYL ALCOHOL BASED THERMOPLASTIC ELASTOMERS AND VULCANIZATES

BACKGROUND OF THE INVENTION

The present invention relates to thermoplastic elastomers (TPE) and thermoplastic vulcanizates (TPV), also known in the art as dynamically vulcanized alloys (DVA), with improved gas-barrier properties.

Thermoplastic elastomer compositions useful as a gas-barrier layer in pneumatic tires are well known. For example, EP722850B1 discloses a low-permeability thermoplastic elastomer composition which comprises a low-permeability rubber, such as brominated poly(isobutylene-co-paramethylstyrene), referred to hereinafter as BIMS, dispersed in a low-permeability thermoplastic matrix, such as polyamide or a blend of polyamides.

Thermoplastic vulcanizates having improved coring properties are known from, for example, U.S. Pat. No. 6,946,522, which discloses a blend of thermoplastic polypropylene resin, vulcanized butyl rubber, a hydrogenated poly(styrene-b-isoprene-b-styrene) block copolymer and a polybutene oil plasticizer.

Thermoplastic vulcanizates having improved barrier properties are known from, for example, U.S. Pat. No. 7,060,753, which discloses a composition of high melt flow index thermoplastic olefin resin, butyl rubber and an oligomers of isobutylene and butene.

It is known that ethylene-vinyl alcohol copolymers (EVOH) have an excellent gas barrier property. Certain compositions exhibiting low gas permeability performance composed of thermoplastic resin-based blends such as a polyethylene terephthalate and vinyl alcohol-ethylene copolymer (PET/EVOH), where one thermoplastic resin is layered over the other layer to form plural layers by molding, are disclosed in Japanese Patent Application No. 7-55929. However, since these materials are thermoplastic resin/thermoplastic resin blends, while they are superior in gas barrier performance, they lack flexibility, and therefore, such films are subject to failure if they are used in a vehicle tire which is subject to significant stress and flexing.

A low permeability rubber laminate containing an EVOH layer bonded to a diene-based rubber layer comprising a silane-based coupling agent is disclosed in US 2008/0314490. The EVOH layer must be sufficiently thick to impart gas barrier properties, but sufficiently thin to avoid poor stretch flex fatigue.

There are continuing needs to improve the barrier properties of thermoplastic elastomers and dynamically vulcanized thermoplastic barrier films, and/or to improve the mechanical properties of films employing EVOH in a barrier layer.

SUMMARY OF THE INVENTION

In accordance with an embodiment of the invention, a thermoplastic elastomer (TPE) or thermoplastic vulcanizate (TPV) comprises an ethylene vinyl alcohol copolymer (EVOH), a rubber component dispersed therein and an EVOH-rubber compatibilizer.

In an embodiment, the thermoplastic elastomer composition in the TPE or TPV comprises a thermoplastic resin comprising EVOH, in a continuous phase, and a rubber composition dispersed therein, as a dispersed phase, wherein the rubber composition comprises a cured or curable elastomer.

In an embodiment, the EVOH comprises 20 to 50 mole percent ethylene and saponification of at least 90 percent. In an embodiment, the TPV comprises a diene-based rubber. In another embodiment, the rubber is selected from ethylene-propylene-diene rubber (EPDM), butyl rubber, halobutyl rubber, isobutylene-co-p-methylstyrene rubber, and mixtures thereof.

In a particular embodiment, the rubber is selected from an isobutylene derived rubber, and mixtures thereof, and the EVOH-rubber compatibilizer comprises a saturated rubber, such as, for example, hydrogenated styrene block copolymer, hydrogenated styrene block copolymer, or the like.

In another particular embodiment, the rubber comprises EPDM and the EVOH-rubber compatibilizer comprises polyethylene, such as, for example, linear low density polyethylene (LLDPE), and in another embodiment, the EVOH-rubber compatibilizer can further comprise high density polyethylene (HDPE), ethylene-vinyl acetate copolymer (EVA), polypropylene, or a combination thereof.

In various embodiments, the TPV can further comprise a filler, a cure system, a silicone fluid, a plasticizer, or any combination thereof. In another embodiment the TPV can further comprise liquid polybutene.

In another embodiment, the TPV is formed into an air barrier layer in a pneumatic tire. In another embodiment, a tire innerliner comprises the TPV described herein. In a further embodiment, a hose comprises an elastomeric layer coextruded with a layer comprising the TPV described herein.

In another embodiment, a thermoplastic elastomer comprises: (i) 100 parts by weight of a curable elastomer selected from butyl rubber, halobutyl rubber and combinations thereof; (ii) from 10 to 100 parts by weight of a thermoplastic ethylene vinyl alcohol copolymer (EVOH); (iii) from about 30 to about 40 parts by weight of an elastomeric styrene-isobutylene block copolymer or elastomeric hydrogenated styrene block copolymer; and (iv) a cure package for the curable elastomer. In an embodiment, the thermoplastic elastomer can also optionally comprise: from about 10 to about 30 wt % of the composition of an oligomer of isobutylene and n-butene; from 0 up to about 60 parts by weight of a filler; from about 0.05 to about 5 wt % of the composition of a silicone fluid; or a combination thereof.

In an embodiment, the elastomeric hydrogenated styrene block copolymer is present, wherein the hydrogenated styrene block copolymer is selected from hydrogenated poly(styrene-b-isoprene) (SEP), hydrogenated poly(styrene-b-isoprene-b-styrene) (SEPS), hydrogenated poly(styrene-b-butadiene-b-styrene) (SEBS), hydrogenated poly(styrene-b-isoprene/butadiene-b-styrene) (SEEPS), and combinations thereof. In an embodiment, a thermoplastic vulcanizate is obtained by dynamically vulcanizing the thermoplastic elastomer.

In another embodiment, a thermoplastic elastomer composition comprises: (a) a thermoplastic vulcanizate comprising ethylene-propylene rubber and polypropylene; and (b) from 15 to 50 percent, by total weight of the thermoplastic elastomer composition of: (i) a thermoplastic ethylene-vinyl alcohol copolymer (EVOH), wherein the EVOH comprises from 5 to 40 wt % of the thermoplastic elastomer composition; and (ii) from 10 to 45 wt % of the thermoplastic elastomer composition of a modifier, wherein the modifier comprises one or more of polyethylene, ethylene-vinyl acetate copolymer, and polypropylene wax. In an embodiment, the thermoplastic elastomer comprises from 10 to 30 wt % of linear, low density polyethylene. In a further embodiment, the modifier further comprises from 1 to 5 wt % of the composition of a polypropylene-EVOH regrind stabilizer.

In an embodiment, the thermoplastic elastomer composition is prepared by the steps of (a) dynamically vulcanizing a mixture of the ethylene-propylene rubber and the polypropylene to obtain the thermoplastic vulcanizate, and (b) melt mixing the thermoplastic vulcanizate from step (a) with the EVOH and the modifier.

In another embodiment, an improvement is provided in a method of preparing a thermoplastic vulcanizate comprising combining a thermoplastic resin, a rubber and a cure package, and dynamically vulcanizing the combination to form a TPV. The improvement comprises incorporating an EVOH and an EVOH-elastomer compatibilizer in the TPV to improve gas barrier properties. In one embodiment, the EVOH is incorporated in the thermoplastic resin during a dynamic vulcanization step, and in another the EVOH is incorporated in the TPV in a post-vulcanization melt mixing step.

DETAILED DESCRIPTION

Preferred applications of the present invention relate to thermoplastic elastomer compositions for tire innerliner and barrier films in other articles, more particularly to thermoplastic elastomer compositions exhibiting excellent durability and impermeability to fluids such as air, as well as to liquids. Preferred compositional features are directed to enhanced or maximized content of dispersed elastomers in the form of vulcanized particles dispersed in a generally continuous thermoplastic matrix. Additionally, particularly preferred aspects of the invention relate to efficient mixing processes suitable for producing a thermoplastic elastomer composition capable of providing a rubber domain comprising small sized particles while such domains are also highly extensible and elastic.

The preferred elastomer exhibits low permeability and is preferably a polymer such as a diene-based rubber such as butyl rubber, halobutyl rubber, styrene-isobutylene-styrene, ethylene-propylene-diene rubber (EPDM), or blends thereof with one another or with other polymers. In one embodiment, the rubber is preferably a polymer such as halogenated isobutylene-derived elastomers and particularly preferred are brominated isobuitylene-derived elastomers, especially brominated parametylstyrene-co-isobutylene polymers; especially preferred are bromobutyl elastomers exhibiting high content of bromoparamethyl styrene; and also preferred are commercial bromobutyl elastomers, or blends thereof with one or more of the aforementioned brominated elastomers with one another or with other polymers.

Throughout the entire specification, including the claims, the following terms shall have the indicated meanings.

The term "oligomer" is used herein in its generally accepted sense as defining a polymer molecule consisting of only a few monomer units, i.e., a dimer, trimer or tetramer.

Polymer may be used to refer to homopolymers, copolymers, interpolymers, terpolymers, etc. Likewise, a copolymer may refer to a polymer comprising at least two monomers, optionally with other monomers. All molecular weights are weight average unless otherwise noted.

When a polymer is referred to as comprising a monomer, the monomer is present in the polymer in the polymerized form of the monomer or in the derivative form the monomer. However, for ease of reference the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

Isoolefin refers to any olefin monomer having two substitutions on the same carbon.

Multiolefin refers to any monomer having two double bonds. In a preferred embodiment, the multiolefin is any monomer comprising two conjugated double bonds such as a conjugated diene like isoprene. In another preferred embodiment, the multiolefin is any monomer comprising two non-conjugated double bonds.

Elastomer or elastomers as used herein, refers to any polymer or composition of polymers consistent with the ASTM D1566 definition. The terms may be used interchangeably with the term "rubber(s)."

Substituted refers to the substitution of at least one hydrogen of the chemical compound or constituent.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such curing reactions is not required for the elastomer-containing composition to be considered "cured," "vulcanized" or "crosslinked." For example, for purposes of the present invention, a tire comprising an innerliner layer composition based on the present invention is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks.

A thermoplastic elastomer (TPE) can be generically defined as a rubber-like material that, unlike conventional rubbers, can be processed and recycled like thermoplastic materials (ASTM D1566). When the TPE contains a vulcanized rubber, it may also be referred to as a thermoplastic vulcanizate (TPV), defined as a TPE with a chemically cross-linked rubbery phase, produced by dynamic vulcanization (ASTM D1566).

As used herein, the terms TPE and TPV refer to a blend of thermoplastic resin and rubber. Such materials have the characteristic of elasticity, i.e., they are capable of recovering from large deformations quickly and forcibly. One measure of this rubbery behavior is that the material will retract to less than 1.5 times its original length within one minute, after being stretched at room temperature to twice its original length and held for one minute before release (ASTM D1566). Another measure is found in ASTM D412, for the determination of tensile set. The materials are also characterized by high elastic recovery, which refers to the proportion of recovery after deformation and may be quantified as percent recovery after compression. A perfectly elastic material has a recovery of 100% while a perfectly plastic material has no elastic recovery. Yet another measure is found in ASTM D395, for the determination of compression set.

In one embodiment a TPE and especially a TPV comprises an ethylene vinyl alcohol copolymer (EVOH) in the thermoplastic phase, a cured rubber dispersed therein, and a compatibilizer that is compatible with both the thermoplastic component(s) phase and the cured rubber phase or otherwise improves compatibility between the thermoplastic component(s) phase and the cured rubber phase.

Thermoplastic Component—Ethylene Vinyl Alcohol Copolymer (EVOH)

The thermoplastic component in one embodiment comprises an ethylene vinyl alcohol copolymer. The EVOH in an embodiment has a polymerized ethylene component proportion of from 20 to 50 mole percent and a degree of hydrolysis of 90% or more. In embodiments, the EVOH has an ethylene content from 30 mol % to 50 mol %, an ethylene content from 30 mol % to 40 mol %, an ethylene content from 30 mol % to 34 mol %, an ethylene content from 34 mol % to 36 mol %, an ethylene content from 36 mol % to 40 mol %, an ethylene content from 40 mol % to 46 mol %, an ethylene content from 46 mol % to 50 mol %, or a mixture thereof, and the like.

In general, higher ethylene contents provide more flexibility, better processability and better compatibility with rubber components, whereas lower ethylene contents and/or a high degree of hydrolysis or saponification are beneficial to improved air barrier properties. In an embodiment, the EVOH is semicrystalline; a higher degree of crystallinity of the EVOH generally improves the air barrier property, i.e., reduces the oxygen transmission rate. In one embodiment, the EVOH is subjected to a heat treatment in the TPE or DVA to increase crystallinity and improve air barrier characteristic. In one embodiment, the EVOH polymer by itself has an oxygen transmission rate at 65% relative humidity and 20° C. by test method ISO 14663-2 annex C of less than less than 5 cc·20 μm/m²·day·atm, preferably less than less than 3 cc·20 μm/m²·day·atm, more preferably less than less than 2 cc·20 μm/m²·day·atm.

The EVOH can be produced, for example, by saponifying an ethylene-vinyl acetate copolymer (EVA) obtained by, for example, a radical polymerization of ethylene and vinyl acetate. In an embodiment, a product commercially available, for example, from EVAL Company of America, may be used alone or in any combinations, such as EVAL E 105A (ethylene content 44 mol %), EVAL H171B (ethylene component ratio of 38 mol %), or EVAL L171B (ethylene component ratio of 26 mol %), for example.

In embodiments, the EVOH is present in an amount effective to improve the air barrier properties of the TPV, for example, in one embodiment the EVOH is present at from 10 parts by weight per 100 pats by weight of rubber (phr) up to 100 phr.

Thermoplastic Component—Other Resins

In embodiments, additional useful thermoplastic resins can include any thermoplastic homopolymer, copolymer or mixture thereof having a Young's modulus of more than 500 MPa, which is preferably compatible with the EVOH component and the elastomer component(s), and, preferably, having an air permeation coefficient at 30° C. of less than $60 \times 10^{-12}$ cc-cm/cm²-sec-cm Hg, and, preferably, a melting point of about 170° C. to about 230° C., including, but not limited to, one or more of the following:

a) polyamide resins: nylon 6 (N6), nylon 66 (N66), nylon 46 (N46), nylon 11 (N11), nylon 12 (N12), nylon 6,10 (N610), nylon 6,12 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

b) polyester resins: polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxyalkylene diimide diacid/polybutyrate terephthalate copolymer and other aromatic polyesters;

c) polynitrile resins: polyacrylonitrile (PAN), polymethacrylonitrile, acrylonitrile-styrene copolymers (AS), methacrylonitrile-styrene copolymers, methacrylonitrile-styrene-butadiene copolymers;

d) polymethacrylate resins: polymethyl methacrylate, polyethylacrylate;

e) polyvinyl resins (for illustration, not limitation): vinyl acetate (EVA), polyvinyl alcohol (PVA), vinyl alcohol/ethylene copolymer (EVOA) (other than the EVOH copolymers defined above, i.e., EVOH containing less than 20 or more than 50 mol % ethylene and/or hydrolysis of less than 90%), polyvinylidene chloride (PVDC), polyvinyl chloride (PVC), polyvinyl/polyvinylidene copolymer, polyvinylidene chloride/methacrylate copolymer;

f) cellulose resins: cellulose acetate, cellulose acetate butyrate;

g) fluorine resins: polyvinylidene fluoride (PVDF), polyvinyl fluoride (PVF), polychlorofluoroethylene (PCTFE), tetrafluoroethylene/ethylene copolymer (ETFE);

h) polyimide resins: aromatic polyimides;

i) polysulfones;

j) polyacetals;

k) polylactones;

l) polyphenylene oxide and polyphenylene sulfide;

m) styrene-maleic anhydride;

n) aromatic polyketones;

o) polyolefins, such as polyethylene, polypropylene, including crystalline and semi-crystalline propylene homopolymers and copolymers, or the like; and p) mixtures of any and all of a) through o) inclusive as well as mixtures of any of the illustrative or exemplified thermoplastic resins within each of a) through p) inclusive.

Elastomer Component

The elastomer of the thermoplastic elastomer in various embodiments can be a diene-based rubber, such as butyl, halobutyl, and/or ethylene propylene diene rubber (EPDM), a halogenated isobutylene containing rubber, or the like. Typically, the rubber component is present in a composition with the thermoplastic resin described above, in a weight ratio of rubber to resin of about 10/90 to 90/10; preferably about 55/45 to 80/20; more preferably about 60/40 to about 75/25; more preferably about 65/35 to about 75/25.

Halogenated rubber is defined as a rubber having at least about 0.1 mol % halogen, such halogen selected from the group consisting of bromine, chlorine and iodine. Preferred halogenated rubbers useful in this embodiment include halogenated isobutylene-based homopolymers or copolymers. These polymers can be described as random copolymer of a $C_4$ to $C_7$ isomonoolefin derived unit, such as isobutylene derived unit, and at least one other polymerizable unit. In one embodiment, the halogenated isobutylene-based copolymer is a butyl-type rubber or branched butyl-type rubber, especially brominated versions of these elastomers.

Butyl rubbers are typically prepared by reacting a mixture of monomers, the mixture having at least (1) a $C_4$ to $C_{12}$ isoolefin monomer component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin. The isoolefin is preferably a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene, methylstyrene, chlorostyrene, dichlorostyrene methoxystyrene, indene, and indene derivatives, are also suitable for homopolymerization or copolymerization in butyl rubbers. One embodiment of the butyl rubber polymer useful in an embodiment is obtained by reacting 95 to 99.5 wt % of isobutylene with 0.5 to 8 wt % isoprene, or from 0.5 wt % to 5.0 wt % isoprene in yet another embodiment.

Halogenated butyl rubber is produced by the halogenation of the butyl rubber product described above. Halogenation can be carried out by any means, and the embodiments herein are not limited by the halogenation process. The halogenated butyl rubber typically has a Mooney Viscosity of about 20 to about 70 (ML 1+8 at 125° C.); for example, about 25 to about 55 in another embodiment. The halogen content is typically about 0.1 to 10 wt % based on the weight of the halogenated butyl rubber; for example, about 0.5 to 5 wt %; alternatively, about 0.8 to about 2.5 wt %; for example, about 1 to about 2 wt %.

Another useful embodiment of butyl rubber is halogenated, branched or "star-branched" butyl rubber. In one embodiment, the star-branched butyl rubber ("SBB") is a composition comprising butyl rubber and a polydiene or block copolymer. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the embodiments are not limited to the type of polydiene or branching agent used to make the SBB.

The SBB used may be halogenated. In one embodiment, the halogenated star-branched butyl rubber ("HSBB") comprises a butyl rubber, either halogenated or not, and a polydiene or block copolymer, either halogenated or not. In one embodiment, the HSBB is typically a composition comprising halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber, styrene-butadiene-styrene and styrene-isoprene-styrene block copolymers. Polydienes can be present, based on the total monomer content in wt %, typically greater than about 0.3 wt %, alternatively about 0.3 to 3 wt %, or about 0.4 to 2.7 wt %.

Other useful butyl rubbers are isoolefin/para-alkylstyrene copolymers that include random copolymers comprising a $C_4$ to $C_7$ isoolefin, such as isobutylene or other $C_4$ to $C_7$ isoolefins listed above, and a halomethylstyrene. The halomethylstyrene may be an ortho-, meta-, or para-alkyl-substituted styrene. In one embodiment, the halomethylstyrene is a p-halomethylstyrene containing at least 80%, more preferably at least 90 wt % of the para-isomer. The "halo" group can be any halogen, desirably chlorine or bromine, most preferably bromine. The copolymer may also include functionalized interpolymers wherein at least some of the alkyl substituent groups present on the styrene monomer units contain benzylic halogen or another functional group described further below. These interpolymers are herein referred to as "isoolefin copolymers comprising a halomethylstyrene" or simply "isoolefin copolymer."

Most useful of such copolymers of isobutylene and p-methylstyrene are those containing from 0.5 to 20 mol % p-methylstyrene wherein up to 60 mol % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed halogenated poly(isobutylene-co-p-methylstyrene) or brominated poly(isobutylene-co-p-methylstyrene) (BIMS). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95 wt % of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene) polymers are brominated polymers which generally contain from about 0.1 to about 5 wt % of bromomethyl groups. In yet another embodiment, the amount of bromomethyl groups is about 0.2 to about 2.5 wt %. Expressed another way, preferred copolymers contain about 0.05 to about 2.5 mol % of bromine, based on the weight of the polymer, more preferably about 0.1 to about 1.25 mol % bromine, and are substantially free of ring halogen or halogen in the polymer backbone chain. In one embodiment, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity (1+8, 125° C., ASTM D1646, modified) is about 30 to about 60 Mooney units.

Other $C_4$ to $C_7$ isoolefin derived unit containing elastomers suitable for use in the present invention include polymers comprising the isoolefin and at least two multiolefins wherein the multiolefins have different backbone structures prior to polymerization. Such polymers include both block and random polymers of $C_4$ to $C_8$ isoolefin derived units, $C_4$ to $C_{14}$ multiolefin derive units, and alkylstyrene derived units. One such polymer may be formed from isobutylene, isoprene, and alkylstyrene, preferably methylstyrene, monomers. Another suitable polymer may be polymerized from isobutylene, cyclopentadiene, and alkylstyrene monomers. Such polymers are obtained under cationic polymerization conditions.

The term "ethylene/propylene rubber" is used herein to generically refer to ethylene/propylene rubbers with (EPDM) or without (EPM) a nonconjugated diene termonomer. In an embodiment, ethylene/propylene/diene rubber (EPDM) comprises a copolymer of ethylene, propylene and a nonconjugated diene. Ethylene/propylene rubber without a nonconjugated diene (EPM) is another embodiment. The ratio of ethylene to propylene in ethylene/propylene rubbers is from about 40/60 to about 85/15 and more desirably from about 50/50 to about 75/25. Nonconjugated dienes for use in EPDM are well known to the art and include 1,4-hexadiene, ethylidene norbornene, dicyclopentadiene, 5-ethylidene-2-norbornene, 1,3-cyclopentadiene, 5-vinylnorbornene, combinations thereof and the like. The amount of the nonconjugated diene in the copolymer is usually up to about 10 wt %, more desirably from about 0.5 to about 4 or 5 wt % with the remainder being ethylene or propylene, by weight of the EPDM rubber component. Ethylene/propylene rubber without a nonconjugated diene (EPM) can be crosslinked by radiation curing or peroxide curing. EPDM can be crosslinked with any of the curatives used with the butyl or other unsaturated rubbers.

Generally, other suitable rubbers useful in the present embodiments include, for example natural rubber (NR), isoprene rubber (IR), epoxylated natural rubber, styrene butadiene rubber (SBR), polybutadiene rubber (BR) (including high cis BR and low cis BR), nitrile butadiene rubber (NBR), hydrogenated NBR, hydrogenated SBR, maleic acid-modified ethylene propylene rubbers (M-EPM), butyl rubber (IIR), isobutylene and aromatic vinyl or diene monomer copolymers, acrylic rubbers (ACM), ionomers, other halogen-containing rubbers (for example, chloroprene rubbers (CR), hydrin rubbers (CHR), chlorosulfonated polyethylenes (CSM), chlorinated polyethylenes (CM), maleic acid-modified chlorinated polyethylenes (M-CM)), silicone rubbers (for example, methylvinyl silicone rubbers, dimethyl silicone rubbers, methylphenylvinyl silicone rubbers), sulfur-containing rubbers (for example, polysulfide rubbers), fluoro rubbers (for example, vinylidene fluoride rubbers, fluorine-containing vinyl ether-based rubbers, tetrafluoroethylene-propylene rubbers, fluorine-containing silicone rubbers, fluorine-containing phosphagen rubbers), thermoplastic elastomers (for example, styrene-containing elastomers, olefin elastomers, ester elastomers, urethane elastomers, or polyamide elastomers), and their mixtures.

Another class of suitable rubber components includes high diene rubbers and their hydrates, which may be used alone, but preferably in a blend with another rubber component(s). High diene content rubbers or elastomers are also referred to as high diene monomer rubber. It is typically a rubber comprising typically at least 50 mol % of a $C_4$-$C_{12}$ diene monomer, typically at least about 60 mol % to about 100 mol %; more preferably at least about 70 mol % to about 100 mol %; more preferably at least about 80 mol % to about 100 mol %. Useful high diene monomer rubbers include homopolymers and copolymers of olefins or isoolefins and multiolefins, or homopolymers of multiolefins. Preferred examples of high diene monomer rubbers include polyisoprene, polybutadiene rubber, styrene-butadiene rubber, natural rubber, chloroprene rubber, acrylonitrile-butadiene rubber and the like, which may be used alone or in combination and mixtures.

Functionalized rubbers maybe advantageously employed. Suitable functionality includes functional groups that can react with reactive functional groups in the thermoplastic component(s), such as hydroxyl or acetate groups in the EVOH, amine functionality present in polyamides, or the like. For example, maleic anhydride, acyllactam, or others can readily react with amines and/or hydroxyls in the polyamides and/or EVOH, respectively. The presence of chemically reactive functionality in such rubbers in an embodiment can further promote reactive compatibilization between the rubber and EVOH leading to a small particle size dispersion of the rubber in the thermoplastic matrix, the rubber particles exhibiting an average particle size of about 1 micron or less; preferably less than about 0.5 micron.

The rubber, dispersed in the thermoplastic matrix in the form of small particles, as noted, is vulcanizable or vulcanized (crosslinked or cured), partially, substantially or fully. Such crosslinking can be accomplished by the dynamic vulcanization method employed by those skilled in the art. If dynamic vulcanization is used, it is also necessary to disperse a suitable curing agent or curing system in the blend to effect vulcanization during mixing and dispersion of the rubber.

Alternatively, if the rubber is susceptible to thermal crosslinking, it can be vulcanized by the application of sufficient thermal energy either during mixing and dispersion in a manner corresponding to dynamic vulcanization, or after it is dispersed in the form of small particles by providing sufficient thermal energy to accomplish such crosslinking after dispersion. As a further alternative, the rubber can be crosslinked by irradiation. In any event, it is preferred that the rubber be dispersed in the EVOH-containing thermoplastic matrix in the form of small particles having an average particle size of about 0.1 micron to about 1 micron; for example about 0.1 micron to about 0.75 micron; or about 0.1 micron to about 0.5 micron.

EVOH-Rubber Compatibilizer(s)

Secondary polymers and other additives may function as compatibilizers or processing aids. As used herein, a "compatibilizer" is an additive that makes two incompatible polymer domains less incompatible. The secondary polymers may be thermoplastic polymers or elastomeric polymers, a mixture thereof, or may be polymers having both thermoplastic and elastomeric domains, and may be present in the thermoplastic phase only, only in the elastomer, in both the elastomer and the thermoplastic phase, at the interface between the elastomer and thermoplastic phase, or any combination.

The compatibilizing secondary polymers in one embodiment generally have at least one domain compatible with the EVOH, which is very polar, and at least another domain compatible with the rubber(s) in the elastomeric phase, which tends to be non-polar. Polymer domains are understood to be thermodynamically compatible if there is intermolecular mixing such that the blend exhibits a single glass transition temperature, Tg, which is usually different from the Tg of either polymer domain. Incompatible polymers will normally exhibit two Tg's which are the same as the Tg's of the respective blend components, and in the worst case the respective polymer phases will exhibit separation. Glass transition temperature can be determined, for example, by differential scanning calorimetry (DSC). Polymer domains can be compatible per se, or made compatible by the presence of an additional component(s) such as another polymer, a processing oil, plasticizer, or the like.

In one embodiment, the secondary polymer is selected for compatibility depending on the particular rubber(s) and/or other thermoplastic component(s) present in the elastomer to obtain a fine dispersion of vulcanized rubber particles. In one embodiment where the primary elastomer component comprises butyl or halobutyl rubber, the secondary polymer can be a non-vulcanizable rubber, such as, for example, a saturated rubber, i.e., a rubber containing less than 0.1% ethylenic unsaturation as a molar percent of the carbon-carbon bonds in the secondary rubber polymer or rubbery domain if the secondary polymer contains both thermoplastic and elastomeric domains. In another embodiment where the primary elastomer comprises an olefin rubber, such as ethylene/propylene rubber, e.g., EPDM, the secondary polymer can comprise a polyolefin such as polyethylene (including ethylene-alpha-olefin copolymers), polypropylene, ethylene-propylene copolymers, or mixtures thereof.

Saturated Rubber Compatibilizers

For example, a suitable non-vulcanizable rubber compatible with both EVOH and butyl rubber is available under the trade designation SEPTON, comprising hydrogenated styrene block copolymers. The non-vulcanizable rubber is not generally crosslinked during the dynamic vulcanization of unsaturated rubbers and may be available to migrate to the rubber-thermoplastic interface and, where it is compatible with both the elastomer and thermoplastic phases, facilitating stabilization of the mixture.

The composition of the invention in one embodiment includes a saturated styrenic block copolymer such as styrene-isobutylene-styrene (SIBS), or hydrogenated styrenic block copolymer such as hydrogenated poly(styrene-b-isoprene) (SEP), hydrogenated poly(styrene-b-isoprene-b-styrene) (SEPS), hydrogenated poly(styrene-b-butadiene-b-styrene) (SEBS), hydrogenated poly(styrene-b-isoprene/butadiene-b-styrene) (SEEPS), or any combination thereof. SIBS is commercially available under the trade designation SIBSTAR (Kaneka Corp); such hydrogenated styrenic block copolymers are available, for example, under the family of SEPTON products, available from Septon Company of America Inc. The amount of block copolymer component in one embodiment generally ranges from about 30 to about 40 parts by weight, per 100 parts of the rubber component of the composition. As used herein, when the saturated rubber component is present it is excluded from the 100 parts by weight rubber or phr basis. For example, a mixture of 100 g chlorobutyl rubber, 30 g SEEPS and 20 g EVOH would contain 100 phr chlorobutyl rubber, 30 phr SEEPS and 20 phr EVOH.

In the preparation of thermoplastic elastomers of the embodiment with hydrogenated styrenic block copolymers, the block copolymer component can be generally incorporated directly into the composition during production of the thermoplastic elastomer, in a one step process, so that it is an integral part of the composition. Since the block copolymer is hydrogenated, it contains very low levels of unsaturation and does not co-cure with the elastomer component of the thermoplastic elastomer during vulcanization. It is believed that the block copolymer forms a co-continuous matrix with the thermoplastic polyolefin resin in the thermoplastic elastomer. Alternatively, the block copolymer can be mechanically blended with a preformed thermoplastic elastomer composition.

Polyolefin Compatibilizers

In the embodiment where the primary elastomer comprises an olefin rubber, the secondary polymer can comprise a thermoplastic polyolefin. Polyethylene compatibilizers in this embodiment can include, for example, highly branched low density polyethylene (LDPE), linear low density polyethylene (LLDPE), very low density polyethylene (VLDPE), high density polyethylene (HDPE), or the like.

LDPE may be obtained from ethylene by polymerization using free-radical initiators under high pressure conditions. Accordingly, LDPE may also be referred to in the art as high pressure polyethylene (HPPE). The free radicals trigger the incorporation of chain lengths along the length of a main chain so forming long chain branches, usually by what is known as a back-biting mechanism. The branches vary in length and configuration. LDPE can be described as heterogeneously branched. The polymer chains formed differ significantly and the molecular weight distribution as determined by gel permeation chromatography (GPC) is broad. The average molecular weight can be controlled with a variety of telogens or transfer agents which may incorporate at the chain ends or along the chain. Comonomers may be used such as olefins other than ethylene or minor amounts of olefinically copolymerizable monomers containing polar moieties such as a carbonyl group.

LDPE is defined for use herein to include a polymer comprising at least 85 mol % of units derived from ethylene which is heterogeneously branched and contains less than 7.5 mol % of units derived from comonomers containing polar moieties such as a carbonyl group, including ethylenically unsaturated esters, e.g., ethylene vinyl acetate, ethylene methyl acrylate, ethylene methacrylic acid, n-butylacrylate (EBA) or ethylene acrylic acid.

Linear ethylene based polymers, which include linear low density polyethylene (LLDPE), are produced using catalytic polymerization mechanisms. Polymerization may be performed with Ziegler-Natta catalysts comprising generally a transition metal component and in most cases an activator or cocatalyst. Monomers such as ethylene or other olefin comonomers incorporate principally at the end of the polymer chain. Backbiting mechanisms are substantially absent. The molecular weight distribution (MWD) as measured by GPC Mw/Mn is relatively narrow, which is defined herein as less than 10. Such polymers tend to be more linear and have zero, or low levels of long chain branches. As used herein in the description and claims, references to non-branched linear polyethylene refer to polymers having a melt index ratio (MIR) of less than 30, wherein the MIR is defined as the melt index ratio as determined at 190° C. according to ASTM D1238, i.e., $I_{21.6}/I_{2.16}$@190° C.

If long chain branches are present in measurable amounts, their length and structure is assumed to be similar and linear. They may be referred to as homogeneously branched linear polyethylene. This term as used herein in the description and claims refers to polymers having an MIR of greater than 35. The molecular weight distribution (MWD, Mw/Mn) for a long chain branched linear polyethylene is less than 6, typically less than 5, with less than 4 indicating a higher level of long chain branching, which is narrow relative to that prevalent for LDPE. Because of the sensitivity of the catalysts to poisoning by polar groups, monomers having polar groups cannot be used. The main comonomers are alpha-olefins.

Linear polyethylene is defined for use herein to include a polymer comprising at least 65 mol % of ethylene derived units and a balance of units derived from an alpha-olefin having from 3 to 12 carbon atoms which is not branched or, if branched, is homogeneously branched. Generally these polymers have an Mw/Mn as determined by GPC differential refractive index (DRI) as described herein of less than 5.5.

Linear polyethylene may be sub-divided into different types depending on their density. The main groups are VLDPE, LLDPE and HDPE. In the general literature the stated density ranges for these polymers may vary. In the specification and claims, VLDPE is defined as a linear polyethylene having a density of less than 0.91 g/cm$^3$; LLDPE is defined as a linear polyethylene having a density of from 0.91 up to 0.94 g/cm$^3$; and HDPE is defined as a linear polymer having a density of above 0.94 g/cm$^3$.

Linear polyethylene may also be subdivided having regard to the nature of the catalysts system used which influences homogeneity and so the overall properties in processing and properties of the film produced. The prefix "zn" is used in the specification and claims, as in "znLLDPE", to indicate that the catalyst system used titanium as the transition metal component and an aluminum alkyl as cocatalyst. The prefix "m" is used in the specification and claims, as in mLLDPE, to indicate that the transition metal component used was a single site catalyst, which may include a metallocene or other single site catalyst, activated by methods well known for such components such alumoxane or a non-coordinating anion; "zn" linear polyethylene types tend to have a greater heterogeneity in terms of molecular weight distribution and composition distribution as compared to "m" linear polyethylene types, as may be determined by suitable fractionation techniques appropriate to the density concerned, such as a measurement of the compositional distribution breadth index (CDBI) or a Crystaf measurement as is known to one of minimal skill in the art.

As used herein, "zn" linear polyethylene types refer to polyethylenes, analyzable by elution fractionation, having a CDBI of less than 45%, whereas "m" linear polyethylene types refer to polyethylene having a CDBI of greater than 50%, the CDBI being determined as described in WO93/03093 (U.S. Pat. No. 5,206,075). At low densities other fractionation techniques can be used to separate "zn" and "m" types of linear polyethylene.

In the case of the mLLDPE as described above, preferably hexane extractables are less than 1.5 wt %, preferably less than 1 wt %, especially less than 0.6 wt %. The FDA hexane extractable test is from the version current to 7 Jul. 2003. The test may be performed according to 21 CFR 177.1520 (d)(3)(ii)(e) using a film for extraction and weighing the dried film after extraction and drying to measure the weight loss.

Generally preferred ethylene polymers and copolymers that are useful as secondary polymers in this embodiment include those sold by ExxonMobil Chemical Company in Houston Tex., including those sold as ExxonMobil HDPE, ExxonMobil LLDPE, and ExxonMobil LDPE; and those sold under the EXACT™, EXCEED™, ESCORENE™, ESCORENE ULTRA™, EXXCO™, ESCOR™, ENABLE™, NTX™, PAXON™ and OPTEMA™ tradenames.

For the secondary polyolefin polymers, catalytic polymerization mechanisms are also used to produce linear polymers based on other olefins, mostly propylene. Examples include propylene based polymers such as polypropylene homopolymer, random propylene copolymer (RCP) as well as propylene based elastomers (PBE), including those described in WO99/07788 and WO2003/040201 having varying degrees of randomness or blockiness. The term "other linear polyolefin polymers" is used in the specification and claims to refer to other linear polymers generally using a catalytic polymerization mechanism with units derived from one or more olefin monomers, that may or may not be branched, but which exclude linear polyethylene as defined above. An example of a low viscosity, high-melting polypropylene suitable as a compatibilizer in an EVOH-EPDM TPV are the polypropylene waxes available under the trade designation EPOLENE from Westlake Chemical Corporation, including the 12,000 molecular weight polypropylene available under the trade designation EPOLENE N-15.

A further class of secondary polyethylene polymers is "differentiated polyethylene" (DPE) according to an embodiment. Differentiated polyethylenes are defined herein as those polyethylene polymers that comprise polar comonomers or termonomers. Polymers having more than two types of monomers, such as terpolymers, are also included within the term "copolymer" as used herein. Typical DPEs are well known in the art and include, but are not limited to, ethylene polymers comprising ethylene n-butyl acrylate, ethylene methyl acrylate acrylic acid terpolymers, ethylene acrylic acid, ethylene methyl acrylate, zinc or sodium neutralized ethylene acrylic acid copolymers, ethylene vinyl acetate (EVA), and combinations of the foregoing. One representative example of an EVA compatibilizer comprises EVA available under the trade designation ATEVA from Celanese, e.g., EVA containing 40 wt % vinyl acetate such as that obtained under the trade designation ATEVA 4030AC.

Other Compatibilizers

One class of other compatibilizers according to an embodiment includes additives used to inhibit regrind degradation in compositions of polypropylene (PP) and ethylene-vinyl alcohol copolymers (EVOH). Processing anomalies such as fisheyes are sometimes seen in PP-EVOH regrind extrusion. Polyolefin-EVOH regrind stabilizers are commercially available to inhibit such anomalies, such as for example, GF-20 LDPE resin additive available from EVAL Company of America.

Other compatibilizers according to an embodiment include copolymers such as those having the structure of both or one of the thermoplastic resin and rubber polymer or a structure of a copolymer having an epoxy group, carbonyl group, halogen group, amine group, maleated group, oxazoline group, hydroxy group, etc. capable of reacting with the thermoplastic resin or rubber polymer. The secondary rubber can be selected based upon the type of the thermoplastic resin polymer and rubber polymer to be mixed. Such useful secondary rubbers include maleic anhydride grafted rubbers such as maleic anhydride grafted acrylonitrile-butadiene-styrene, maleic anhydride grafted ethylene-propylene-diene rubber, maleic anhydride grafted styrene-ethylene/butadiene-styrene, and the like and maleated ethylene copolymer rubbers such as maleated ethylene-propylene (EPM), maleated ethylene-butene, maleated ethylene-hexene, maleated ethylene-octene, maleated ethylene-decene, maleated ethylene-propylene-diene, maleated ethylene-vinyl acetate, maleated ethylene-methyl acrylate, maleated ethylene-ethyl acrylate, maleated ethylene-acrylic acid, and the like and mixtures thereof. Also potentially useful rubbers include EPDM/styrene, EPDM/acrylonitrile graft copolymer and their maleic acid-modified forms; styrene/maleic acid copolymer; reactive phenoxy thermoplastic resin; and their mixtures.

Examples of useful, preferred functional groups present in the secondary rubber include compounds comprising a carbonyl bond such as carboxylic acids, esters of carboxylic acids, acid anhydrides, di-esters, salts, amides, and imides. Aromatic vinyl compounds, hydrolyzable unsaturated silane compounds, saturated halogenated hydrocarbons, and unsaturated halogenated hydrocarbons may also be used. Examples of particularly preferred functional groups include, but are not limited, to maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

Polymers suitable to make functionalized polymers useful herein include ethylene polymers and propylene polymers. Particularly preferred polymers include polymers of ethylene copolymerized with one or more of propylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such ethylene polymers are modified with maleic acid or maleic anhydride. Another class of particularly preferred polymers includes polymers of propylene copolymerized with one or more of ethylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such propylene polymers are modified with maleic acid or maleic anhydride.

In a preferred embodiment, the polymer to be functionalized is grafted with maleic anhydride so the maleic anhydride is covalently bonded to the backbone polymer chain of the polymer. The anhydride functionality grafted onto the polymer may remain as an anhydride, may be oxidized into acid functional groups, and/or may be further reacted by processes known in the art to introduce other functional groups such as amides, amines, alcohols, and the like.

Another class of particularly preferred polymers include polymers of a $C_4$ to $C_7$ isoolefin (such as isobutylene) copolymerized with one or more of isoprene, isobutylene. Preferably such isobutylene polymers are modified with maleic acid or maleic anhydride. Particularly preferred functionalized polymer include maleated copolymers of isobutylene and isoprene, maleated copolymers of isobutylene and paramethylstyrene, maleated halobutyl type copolymers, maleated SBB type copolymers and maleated BIMS type copolymers. Various methods are known in the art that may be used for functionalizing polymers. These include, but are not limited to, selective oxidation, free radical grafting, ozonolysis, epoxidation, and the like.

Preferably, the functionalized polymer comprises maleic anhydride present at a concentration selected from the group consisting of less than about: 50 wt %, 45 wt %, 40 wt %, 35 wt %, 30 wt %, 25 wt %, 20 wt %, 15 wt %, 10 wt %, 9 wt %, 8 wt %, 7 wt %, 6 wt %, 5 wt %, 4 wt %, 3 wt %, and 2 wt % maleic anhydride. Also preferably the level of maleic anhydride (MA) in the polymer-g-MA may be greater than about 0.1 wt %, preferably greater than about 0.5 wt %, alternately greater than about 1 wt % maleic anhydride. In a preferred embodiment, the functionalized polymer may comprise about 0.1 to about 10 wt % maleic anhydride; preferably about 0.25 to about 5 wt %; more preferably about 0.5 to about 4 wt %; still more preferably about 0.75 to about 3.5 wt %; such as about 1.5 to about 2.5 wt % of maleic anhydride. The functional group content of the grafted polymer may be determined by Fourier Transform Infrared (FTIR) spectroscopy based on a calibration with standards whose absolute functional group content has been determined.

By having another rubber, the overall rubber content, counting both the primary rubber and the secondary rubber, can be increased in the thermoplastic elastomer composition while maintaining a desirable morphology including small particle size dispersion of the rubber components in the polyamide matrix. The increase in maximum rubber content can be realized particularly in view of the restricted coalescence of the elastomer particles when in the presence of an immiscible secondary rubber. Furthermore, by controlling the amount of the secondary rubber concentration at a low or minor level as described above, it is possible to avoid the need to cure or vulcanize the secondary rubber in order to substantially avoid or prevent its coalescence. This is particularly true in one embodiment since the secondary rubber may be reactive in the presence of and with the thermoplastic resin and may become substantially immobilized. Without the need to add curatives to the secondary rubber it is then unnecessary to pre-mix or to pre-compound it with curatives (although curatives can optionally be added and the secondary rubber dynamically vulcanized therewith), and direct addition of the secondary rubber to the extruder mixer is feasible during extrusion mixing; the secondary rubber preferably is provided in pellet form. Furthermore, since most functionalized rubbers, such as maleated ethylene copolymer rubbers and maleic anhydride grafted rubbers, are fairly permeable, it is desirable to keep the secondary rubber concentration low, typically not more than 20 wt %; preferably about 1 wt % to about 20 wt %; more preferably about 1 wt % to about 10 wt % or less, based on the total weight of the overall composition. The amount of the secondary, functionalized compatibilizer rubber blended is typically not more than about 20 wt %; preferably less than about 10 wt %; generally about 0.5 wt % to about 20 wt %; for example about 5 wt % to about 15 wt %; such as about 7.5 wt % to about 12.5 wt %.

General Procedure

Generally, polymer compositions, e.g., those used to produce tires, are crosslinked in the finished tire product. Crosslinking or vulcanization is accomplished by incorporation of curing agents and/or accelerators; the overall mixture of such agents being typically referred to as a cure "system." A cure system is used because typically more than one curing agent is employed for beneficial effects, for example, where a mixture of high diene rubber and a less reactive elastomer is used.

For purposes of dynamic vulcanization in the presence of a thermoplastic resin to form, for example, a highly impermeable composition, any conventional curative system which is capable of vulcanizing the particular elastomer(s) may be used herein. Dynamic vulcanization according to an embodiment can occur prior to, during and/or following introduction of the ethylene-vinyl alcohol copolymer (EVOH).

Crosslinking or curing agents include at least one of, e.g., sulfur, zinc oxide, and fatty acids and mixtures thereof. Generally, polymer compositions may be crosslinked by adding curative agents, for example sulfur, metal oxides (i.e., zinc oxide, ZnO), organometallic compounds, phenol formaldehyde resins, radical initiators, etc., and heating the composition or mixture. The following are common curatives that can function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., the stearate salts of Zn, Ca, Mg, and Al), or with stearic acid, and either a sulfur compound or an alkylperoxide compound. Suitable curative systems for the elastomeric component of the present invention include zinc oxide in combination with zinc stearate or stearic acid and, optionally, one or more of accelerators or vulcanizing agents.

In one embodiment, the curative may comprise an organic peroxide, such as, for example, dicumyl peroxide, di-t-butyl peroxide, t-butylcumyl peroxide, benzoyl peroxide, 2,5-dimethyl-2,5-di(t-butylperoxy)hexine-3,2,5-dimethyl-2,5-di(t-butylperoxy)hexane, 1,3-bis(t-butylperoxyisopropyl)benzene, 4,4-di-t-butylperoxy-valerenate-n-butyl ester, etc. Peroxide curatives are specifically excluded from the thermoplastic elastomer in an embodiment when there is present one or more thermoplastic resins that would cause such resins to crosslink themselves in the presence of the peroxide, resulting in an excessively cured, non-thermoplastic composition.

In another embodiment, the curative may comprise a phenol formaldehyde resin, optionally halogenated, and optionally with zinc oxide and carboxylic acid metal salts, as disclosed in U.S. Pat. No. 7,803,875, which is hereby incorporated herein by reference for all jurisdictions where permitted. Commercially available phenol formaldehyde resins may include, for example, SP-1045 octylphenol curing resin, or SP-1056F brominated octylphenol curing resin, both available from Schenectady International, Inc.

Curative accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of rubber involves complex interactions between the curative, accelerator, activators and polymers. Ideally, the entire available curative is consumed in the formation of effective crosslinks which join individual polymer chains to one another and enhance the overall strength of the polymer matrix. Numerous accelerators are known in the art. Curatives, accelerators and the cure systems of which they are a part that are useful with one or more crosslinkable polymers are well-known in the art.

The cure system can be dispersed in a suitable concentration into the rubber component, the rubber component optionally containing one or more filler, extender and/or plasticizer by, e.g., mixing the rubber and the cure system components in a process step prior to addition of the rubber-containing composition to the thermoplastic using any mixing equipment commonly used in the rubber industry for such purpose, e.g., a Banbury mixer, a mixing extruder and the like. Such mixing is commonly referred to as "accelerating" the rubber composition. Alternatively, the rubber composition can be accelerated in a stage of a mixing extruder prior to carrying out dynamic vulcanization, although this is difficult to control in a commercial, practical, integrated process and is less desirable. It is particularly preferred that the cure system be dispersed in the rubber phase, or in a rubber composition also optionally including one or more fillers, extenders and other common ingredients for the intended end-use application, prior to the addition of the rubber to the thermoplastic resin(s) in the mixing equipment in which it is intended to carry out dynamic vulcanization. By so doing, the precompounded rubber composition can be pelletized for more efficient and effective feeding to the dynamic vulcanization equipment, preferably a mixing extruder, as described below.

In one embodiment of the invention, at least one curing agent is typically present at about 0.1 to about 15 phr; alternatively at about 0.5 to about 10 phr.

In one embodiment, it is preferred that the dynamically vulcanized compositions comprise the rubber component(s) in the form of dispersed, substantially fully cured, small particles in a continuous matrix of thermoplastic resin comprising the EVOH. The dynamically vulcanized rubber component in one embodiment is preferably dispersed in the EVOH-containing matrix in the form of small particles having an average particle size of about 0.1 micron to about 1 micron; for example about 0.1 micron to about 0.75 micron; or about 0.1 micron to about 0.5 micron. Particle size can be determined by methods well known in the art and including tapping phase atomic force microscopy (AFM).

Generally, the term "dynamic vulcanization" is used to denote a vulcanization process in which a thermoplastic resin and at least one vulcanizable rubber are mixed under conditions of high shear and elevated temperature in the presence of a curing agent or curing system for the rubber(s). As a result, the rubber is simultaneously crosslinked and dispersed as particles, preferably in the form of a microgel, within the resin which forms or is present as a continuous matrix. The resulting composition is known in the art as a "dynamically vulcanized alloy" or DVA. Typically, dynamic vulcanization is effected by mixing the ingredients at a temperature which is at or above the curing temperature of the rubber, and at or above the melting temperature of the resin. The unique characteristic of the dynamically vulcanized or cured composition is that, notwithstanding the fact that the rubber is cured the composition can be processed and reprocessed by conventional thermoplastic processing techniques such as extrusion, injection molding, compression molding, etc. Scrap and/or flashing can also be salvaged and reprocessed. In a typical dynamic vulcanization process, curative addition is altered so as to substantially simultaneously mix and vulcanize, or crosslink, at least one of the vulcanizable components in a composition comprising at least one vulcanizable rubber, elastomer or polymer and at least one polymer or resin not vulcanizable using the vulcanizing agent(s) for the at least one vulcanizable component. Dynamic vulcanization can be carried out in various types of commercial equipment generally available in the rubber and plastics industry including Banbury® internal mixers, roll mixers, and mixing extruders.

Because the DVA can be reprocessed, the EVOH and/or any compatibilizer(s) may in one embodiment be incorporated into the DVA after dynamic vulcanization of the rubber in a thermoplastic resin other than EVOH, or additional EVOH may be incorporated into the DVA after dynamic vulcanization with a thermoplastic resin containing a first portion of the EVOH, which may be the same or different with respect to the post vulcanization EVOH. In this manner, commercially available TPV's which do not contain EVOH can be modified by the addition of EVOH in a melt mixing step, which can also include the addition of any compatibilizer(s) in, prior to or at the same time as or after the EVOH.

The thermoplastic elastomer composition thus obtained is structured with the elastomer component forming a discontinuous phase dispersed as a dispersion phase (domain) in a matrix of the nylon resin which forms a continuous phase. As a consequence of dynamic vulcanization, the composition remains thermoplastic and a film, layer or sheet like structure of the composition can be formed into a laminate, for example, with an adhesive or tie layer.

By molding the thermoplastic elastomer composition obtained into a sheet, film, or tube using a T-sheeting die, straight or crosshead structure tubing die, inflation molding cylindrical die, etc., at the end of a single-screw extruder, or by calendering, it is possible to use the composition as the air permeation preventive layer, e.g., an innerliner, of a pneumatic tire and as a component or layer of a hose, etc. In one embodiment, the hose can be manufactured by coextruding the composition as a barrier layer together with a structural layer such as rubber.

The sheet or tubular molded article thus obtained can be effectively used for an innerliner layer of a pneumatic tire or the hose tube or hose cover of a low gas permeable hose. Furthermore, the low permeability characteristics of the composition are suitable for uses with fluids other than gasses, e.g., liquids such as water, hydraulic fluid, brake fluid, heat transfer fluid, etc., provided that the layer in direct contact with the fluid has suitable resistance to the fluid being handled.

The compositions described herein may have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black, modified carbon black such as silica treated or silica coated carbon black, and the like. Reinforcing grade carbon black is preferred. A particularly useful grade of carbon black is Mitsubishi Carbon Black grade MA600, also identified as a medium color furnace black. The filler may be present at a level of from 0 to about 60 phr; such as about 1 to about 50 phr; or about 10 to about 40 phr; such as about 20 to about 35 phr.

Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl), tetrakis-(methylene-(3,5-di-(tert)-butyl-4-hydrocinnamate)) methane (IRGANOX 1010), etc. Examples of hindered phenolic antioxidants are commercially available under the IRGANOX series of trade designations including IRGANOX 565, IRGANOX 1010 and IRGANOX 1076 from Ciba Specialty Chemicals (Basel, Switzerland). In one embodiment, the TPV composition comprises from 0.01 to 3 wt % of total antioxidant on an active or neat basis (excluding inerts in as-received commercially available antioxidant packages, and including any antioxidant in the blend components such as EVOH), preferably from 0.05 to 2 wt %.

A process or plasticizer oil may be present in the compositions. Such oils are primarily used to improve the processing of the composition during preparation of the layer, e.g., mixing, calendering, etc. Generally, the process oil may be selected from paraffinic oils, aromatic oils, naphthenic oils, and polybutene oils. Rubber process oils also have ASTM designations depending on whether they fall into the class of paraffinic, naphthenic or aromatic hydrocarbonaceous process oils. The type of process oil utilized will be that customarily used in conjunction with a type of elastomer component and a skilled rubber chemist will recognize which type of oil should be utilized with a particular rubber in a particular application. For a thermoplastic elastomer composition the oil in one embodiment may be present at a level of 0 to about 30 wt % of the total composition; in one embodiment, oil is preferably not included in order to maximize impermeability of the composition.

In one embodiment, the process oil is an oligomer of isobutylene and n-butene which can enhance the barrier properties, unlike the use of conventional process oils and slip agents. The oligomer of isobutylene and n-butene, also known as polybutene, is present in the thermoplastic vulcanizate at levels of about 10 to about 30 wt %, based on the total weight of the thermoplastic vulcanizate composition, with about 15 to about 25 wt % being preferred.

In another embodiment, one or more slip additives such as silicone fluids and fatty acid amides, preferably a silicone fluid such as polydimethylsiloxane, may be included to improve processability characteristics. Any effective amount of additive may be used. Typically the amounts range from about 0.05 to about 5 wt %, and preferably from about 0.05 to about 3 wt %, based on the total weight of the composition.

Accordingly, the present invention provides the following embodiments of the invention:

A. A thermoplastic vulcanizate, comprising: a thermoplastic resin comprising an ethylene vinyl alcohol copolymer (EVOH); a cured rubber dispersed therein; and an EVOH-rubber compatibilizer.

B. The thermoplastic vulcanizate of Embodiment A, wherein the EVOH comprises 20 to 50 mol % ethylene and saponification of at least 90%.

C. The thermoplastic vulcanizate of Embodiment A or Embodiment B, wherein the rubber comprises a diene-based rubber.

D. The thermoplastic vulcanizate of any one or any combination of Embodiment A to Embodiment C, wherein the rubber is selected from ethylene-propylene-diene rubber (EPDM), butyl rubber, halobutyl rubber, isobutylene-co-p-methylstyrene rubber, and mixtures thereof.

E. The thermoplastic vulcanizate of any one or any combination of Embodiment A to Embodiment D, wherein the rubber is selected from butyl rubber, halobutyl rubber and mixtures thereof, and the EVOH-rubber compatibilizer comprises a saturated rubber.

F. The thermoplastic vulcanizate of Embodiment E, wherein the saturated rubber comprises styrene-isobutylene block copolymer or hydrogenated styrene block copolymer.

G. The thermoplastic vulcanizate of any one or any combination of Embodiment A to Embodiment F, wherein the rubber comprises ethylene-propylene-diene rubber (EPDM), and the EVOH-rubber compatibilizer comprises polyethylene.

H. The thermoplastic vulcanizate of Embodiment G, wherein the polyethylene compatibilizer comprises linear low density polyethylene (LLDPE).

I. The thermoplastic vulcanizate of Embodiment G or to Embodiment H, wherein the EVOH-rubber compatibilizer further comprises high density polyethylene (HDPE), ethylene-vinyl acetate copolymer (EVA), polypropylene, or a combination thereof.

J. The thermoplastic vulcanizate of any one or any combination of Embodiment A to Embodiment I, further comprising a filler, a cure system, a silicone fluid, a plasticizer, or a combination thereof.

K. The thermoplastic vulcanizate of any one or any combination of Embodiment A to Embodiment J, further comprising a liquid polybutene.

L. The thermoplastic vulcanizate of any one or any combination of Embodiment A to Embodiment K, wherein the thermoplastic vulcanizate is formed into an air barrier layer in a pneumatic tire.

M. A tire innerliner comprising the thermoplastic vulcanizate of any one or any combination of Embodiment A to Embodiment K.

N. A hose comprising an elastomeric layer coextruded with a layer comprising the thermoplastic vulcanizate of any one or any combination of Embodiment A to Embodiment K.

O. A thermoplastic elastomer, comprising: 100 parts by weight of a curable elastomer selected from butyl rubber, halobutyl rubber and combinations thereof; from 10 to 100 parts by weight of a thermoplastic ethylene vinyl alcohol copolymer (EVOH); from about 30 to about 40 parts by weight of an elastomeric styrene-isobutylene block copolymer or elastomeric hydrogenated styrene block copolymer; a cure package for the curable elastomer; optionally from about 10 to about 30 wt % of the composition of an oligomer of isobutylene and n-butene; optionally from 0 up to about 60 parts by weight of a filler; and optionally from about 0.05 to about 5 wt % of the composition of a silicone fluid.

P. The thermoplastic elastomer of Embodiment O comprising from about 30 to about 40 parts by weight of the elastomeric hydrogenated styrene block copolymer, wherein the hydrogenated styrene block copolymer is selected from hydrogenated poly(styrene-b-isoprene) (SEP), hydrogenated poly(styrene-b-isoprene-b-styrene) (SEPS), hydrogenated poly(styrene-b-butadiene-b-styrene) (SEBS), hydrogenated poly(styrene-b-isoprene/butadiene-b-styrene) (SEEPS), and combinations thereof.

Q. A thermoplastic elastomer composition, comprising: a thermoplastic vulcanizate comprising ethylene-propylene rubber and polypropylene; from 10 to 50%, by total weight of the thermoplastic elastomer composition of: (i) a thermoplastic ethylene-vinyl alcohol copolymer (EVOH), wherein the EVOH comprises from 5 to 40 wt % of the thermoplastic elastomer composition; and (ii) from 10 to 45 wt % of the thermoplastic elastomer composition of a modifier, wherein the modifier comprises one or more of polyethylene, ethylene-vinyl acetate copolymer, and polypropylene wax.

R. The thermoplastic elastomer composition of Embodiment Q, comprising from 10 to 30 wt % of linear, low density polyethylene.

s. The thermoplastic elastomer composition of Embodiment R, wherein the modifier further comprises from 1 to 5 wt % of the composition of a polypropylene-EVOH regrind stabilizer.

t. The thermoplastic elastomer composition of any one or any combination of Embodiment Q to Embodiment S, wherein the composition is prepared by the steps of: dynamically vulcanizing a mixture of the ethylene-propylene rubber and the polypropylene to obtain the thermoplastic vulcanizate; and melt mixing the thermoplastic vulcanizate from step (a) with the EVOH and the modifier.

u. The thermoplastic vulcanizate obtained by dynamically vulcanizing the thermoplastic elastomer of any one or any combination of Embodiment O to Embodiment S.

v. In a method of preparing a thermoplastic vulcanizate comprising combining a thermoplastic resin, a rubber and a cure package, and dynamically vulcanizing the combination to form a thermoplastic vulcanizate (TPV), the improvement comprising incorporating an ethylene vinyl alcohol copolymer (EVOH) and an EVOH-elastomer compatibilizer in the TPV to improve gas barrier properties.

w. The improvement of Embodiment V, wherein the EVOH is incorporated in the thermoplastic resin during a dynamic vulcanization step.

x. The improvement of Embodiment V or Embodiment W, wherein the EVOH is incorporated in the TPV in a post-vulcanization melt mixing step.

EXAMPLES

The following commercially available products were used for the components employed in the Examples:

TABLE 1

| Material Designation | Material | Commercial Name/ Potential Source (if applicable) |
|---|---|---|
| Chlorobutyl | Chlorobutyl rubber, 1.26 wt % chlorine, Mooney (ML 1 + 8(125° C.)) 50 ± 5 | EXXON Chlorobutyl 1068 |
| Talc | Bentwood Talc | BT-2202, IMI Fabi, LLC |
| MgO | Magnesium oxide | Maglite, C. P. Hall |
| ZnSt | Zinc stearate | Zinc Stearate D |
| ZnO | Zinc oxide | KADOX 911; Horsehead Corporation |
| DBDTC | Zinc dibutyldithiocarbamate | BUTYL ZIMATE; R. T. Vanderbilt Company |
| Silicone Fluid | Polydimethoxysilane, 350 CSt | DOW CORNING 200 FLUID, 350 CST |
| EVOH | Ethylene-vinyl alcohol copolymer, 44 wt % ethylene | EVAL E105A EVOH |
| SEEPS | Polystyrene-b-poly(ethylene-ethylene/propylene)-b-polystyrene, 32 wt % styrene | SEPTON 4044, Kuraray Co. Ltd. |
| PARAPOL 950 | Polyisobutylene-co-butene oil, MW = 950 | PARAPOL 950, SolvChem, Inc. |
| SANTOPRENE | TPV of dynamically vulcanized EPDM in thermoplastic polypropylene matrix | SANTOPRENE TPV 8201-60; ExxonMobil Chemical |
| LLDPE | Metallocene ethylene-hexene copolymer, 0.918 g/cm$^3$, MI 1.0 g/10 min. (190° C./2.16 kg) | EXCEED 1018CA, ExxonMobil Chemical |
| GF-20 | LDPE resin regrind additive for polyolefin-EVOH mixtures | GF-20 Resin; EVAL Americas |
| EVA | Ethylene vinyl acetate copolymer, 40 wt % vinyl acetate | ATEVA 4030AC; Celanese |

TABLE 1-continued

| Material Designation | Material | Commercial Name/ Potential Source (if applicable) |
|---|---|---|
| PP Wax | Low viscosity polypropylene homopolymer, MW = 12000 | EPOLENE N-15, Westlake Chemical Corporation |

The following measurement methods (standards) were used in determining the properties of compositions of the invention: Hardness (Shore A)—ASTM D2240 or ISO 868; ultimate tensile strength—ASTM D412; M100 (modulus)—ASTM D412; ultimate elongation—ASTM D412; tension set—ASTM D412; compression set—ASTM D395(B); LCR viscosity—measured at 204° C. and 1200 s$^{-1}$ with KAYENESS laboratory capillary rheometer from Dynasco.

Examples 1-2

Chlorobutyl-EVOH TPV was prepared with the proportions of ingredients in Table 2.

TABLE 2

| Ingredients | Example 1 (phr) | Example 2 (phr) |
|---|---|---|
| Chlorobutyl | 100 | 100 |
| Talc | 30 | 30 |
| MgO | 2 | 2 |
| ZnSt | 1 | 1 |
| ZnO | 1.5 | 1.5 |
| DBDTC | 2 | 2 |
| Silicone Fluid | 5 | 5 |
| EVOH | 20 | 20 |
| SEEPS | 30 | 30 |
| PARAPOL 950 | 55 | 40 |
| TOTAL | 246.5 | 231.5 |

The following general procedure was used in the preparation of the thermoplastic vulcanizate for Examples 1 and 2. The compositions were prepared in typical thermoplastic compounding equipment, such as a BRABENDER mixxer. The mixing was carried at 180° C. at 100 rpm in presence of a nitrogen blanket. The chlorobutyl rubber, EVOH and SEEPS were charged into the mixer first along with MgO, ZnSt and ZnO; then the first portion (one-half) of the plasticizer oil was added, and these components were mixed for about 3 minutes to obtain a homogeneous blend as indicated by the torque reading on the BRABENDER mixer. The ZnO and DBDTC were then added carefully and mixing was continued for 2 minutes. At the end the remaining amount of oil plasticizer was added and mixing continued for another 2 minutes before the blend was discharged.

The blends were then molded into 2 mm thick pads with 12 cm×14 cm dimensions on a CARVER hydraulic press. About 7 grams of the homogenized polymer were molded between brass platens lined with TEFLON™ coated aluminum foil. A 0.08 cm (0.033 inch) thick chase with a 10.2×10.2 cm (4 inches×4 inches) square opening was used to control sample thickness. After one minute of preheat at 170° C. or 180° C., under minimal pressure, the hydraulic load was gradually increased to 44.5 to 66.7 kN (10,000 to 15,000 lb$_f$), at which it was held for three minutes. Subsequently the sample and molding plates were cooled for three minutes under 44.5 to 66.7 kN (10,000 to 15,000 lb$_f$) load between the water-cooled platens of the press. Plaques were allowed to equilibrate at room temperature for a minimum of 24 hours prior to physical property testing.

TABLE 3

| Test | Example 1 | Example 2 |
|---|---|---|
| Hardness, ISO | 23 | 23 |
| Ultimate tensile strength, MPa (psi) | 1.14 (165) | 0.84 (122) |
| M100, MPa (psi) | 0.77 (112) | 0.61 (89) |
| Ultimate elongation, % | 269 | 487 |
| Tension set, % | 7 | 15 |
| Compression set, 22 h/100° C., % | 55 | 49 |
| Compression set, 22 h/23° C., % | 50 | 49 |
| LCR viscosity, Pa-s (cP) | 1.23 (179) | 0.52 (76) |

The data in Table 3 show that the chlorobutyl-based TPV including EVOH to enhance air barrier characteristics was flexible and had low melt viscosity for processability.

Examples 3-5

EPDM-EVOH TPV was prepared with the proportions of ingredients in Table 4.

TABLE 4

| Ingredients | Example 3 (parts by wt) | Example 4 (parts by wt) | Example 5 (parts by wt) |
|---|---|---|---|
| SANTOPRENE | 67 | 67 | 67 |
| LLDPE | 20 | 20 | 20 |
| EVOH | 10 | 10 | 10 |
| GF-20 | 3 | 0 | 0 |
| EVA | 0 | 3 | 0 |
| PP Wax | 0 | 0 | 3 |
| TOTAL | 100 | 100 | 100 |

The following general procedure was used in the preparation of the thermoplastic vulcanizate for Examples 3 to 5. The SANTOPRENE TPV, LLDPE, EVOH, and the other compounding ingredients were first mixed in a BRABENDER melt mixer with ~45 mL mixing head. The BRABENDER mixer was operated at 100 rpm and at a temperature of 180° C. Mixing time at temperature was 5-10 minutes, after which the sample was removed from the mixing chamber. The homogenized samples were molded under compression into film on a CARVER hydraulic press in a manner similar to that described above for analysis. The samples were tested for physical properties, and selected results are given in Table 5.

TABLE 5

| Test | Example 3 | Example 4 | Example 5 | SANTOPRENE |
|---|---|---|---|---|
| Hardness, ASTM | 67 | 67 | 67 | 64 (ISO) |
| Ultimate tensile strength, MPa (psi) | 9.51 (1380) | 9.24 (1340) | 6.89 (1000) | 5.90 (856) |
| M100, MPa (psi) | 4.07 (590) | 4.00 (580) | 4.00 (580) | 2.20 (319) |
| Ultimate elongation, % | 269 | 487 | 520 | 520 |
| Specific gravity | 0.98 | 0.90 | 0.95 | 0.95 |

The data in Table 5 show that SANTOPRENE 8201-60 TPV, a commercially available EPDM/PP TPV, can be modified with EVOH and compatibilizers to enhance air barrier characteristics while maintaining comparable or improved hardness and elastomeric properties.

Any range of numbers recited in the specification hereinabove or in the claims hereinafter, such as that representing a particular set of properties, units of measure, conditions, physical states or percentages, is intended to literally incorporate expressly herein by reference or otherwise, any number falling within such range, including any subset of numbers or ranges subsumed within any range so recited.

All documents described herein are incorporated by reference herein, including any patent applications and/or testing procedures to the extent that they are not inconsistent with this application and claims. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A thermoplastic vulcanizate, comprising:
    a thermoplastic resin comprising an ethylene vinyl alcohol copolymer (EVOH);
    a cured rubber dispersed therein; and
    an EVOH-rubber compatibilizer.

2. The thermoplastic vulcanizate of claim 1, wherein the EVOH comprises 20 to 50 mole percent ethylene and saponification of at least 90 percent.

3. The thermoplastic vulcanizate of claim 1, wherein the rubber comprises a diene-based rubber.

4. The thermoplastic vulcanizate of claim 1, wherein the rubber is selected from ethylene-propylene-diene rubber (EPDM), butyl rubber, halobutyl rubber, isobutylene-co-p-methylstyrene rubber, and mixtures thereof.

5. The thermoplastic vulcanizate of claim 1, wherein the rubber is selected from butyl rubber, halobutyl rubber and mixtures thereof, and the EVOH-rubber compatibilizer comprises a saturated rubber.

6. The thermoplastic vulcanizate of claim 5, wherein the saturated rubber comprises styrene-isobutylene block copolymer or hydrogenated styrene block copolymer.

7. The thermoplastic vulcanizate of claim 1, wherein the rubber comprises ethylene-propylene-diene rubber (EPDM), and the EVOH-rubber compatibilizer comprises polyethylene.

8. The thermoplastic vulcanizate of claim 7, wherein the polyethylene compatibilizer comprises linear low density polyethylene (LLDPE).

9. The thermoplastic vulcanizate of claim 7, wherein the EVOH-rubber compatibilizer further comprises high density polyethylene (HDPE), ethylene-vinyl acetate copolymer (EVA), polypropylene, or a combination thereof.

10. The thermoplastic vulcanizate of claim 1, further comprising a filler, a cure system, and at least one of a silicone fluid, a plasticizer, or a combination thereof.

11. The thermoplastic vulcanizate of claim 1, wherein the thermoplastic vulcanizate is formed into an air barrier layer in a pneumatic tire or a hose.

12. A tire innerliner comprising the thermoplastic vulcanizate of claim 1.

* * * * *